United States Patent
Al Dilaimi-Wendler et al.

(10) Patent No.: US 12,475,812 B2
(45) Date of Patent: Nov. 18, 2025

(54) CONTROL OF RESISTENT HARMFUL ORGANISMS

(71) Applicant: Bayer Aktiengesellschaft, Leverkusen (DE)

(72) Inventors: Arwa Al Dilaimi-Wendler, Leverkusen (DE); Carsten Beyer, Hilden (DE); Roland Beffa, Liederbach (DE); Benjamin Buer, Cologne (DE); Jochen Kleemann, Kerpen (DE); Ralf Nauen, Langenfeld (DE); Herve Tossens, Verlaine (BE)

(73) Assignee: Bayer Aktiengesellschaft, Leverkusen (DE)

( * ) Notice: Subject to any disclaimer, the term of this patent is extended or adjusted under 35 U.S.C. 154(b) by 1033 days.

(21) Appl. No.: 16/966,705

(22) PCT Filed: Jan. 25, 2019

(86) PCT No.: PCT/EP2019/051829
§ 371 (c)(1),
(2) Date: Jul. 31, 2020

(87) PCT Pub. No.: WO2019/149626
PCT Pub. Date: Aug. 8, 2019

(65) Prior Publication Data
US 2021/0035473 A1    Feb. 4, 2021

(30) Foreign Application Priority Data
Feb. 2, 2018    (EP) .................................... 18154903

(51) Int. Cl.
*C12Q 1/6869*    (2018.01)
*A01M 1/02*    (2006.01)
(Continued)

(52) U.S. Cl.
CPC .......... *G09B 29/006* (2013.01); *A01M 1/026* (2013.01); *C12Q 1/6869* (2013.01); *G06Q 50/02* (2013.01);
(Continued)

(58) Field of Classification Search
None
See application file for complete search history.

(56) References Cited

U.S. PATENT DOCUMENTS

| 2017/0223947 A1 | 8/2017 | Gall et al. |
| 2019/0191617 A1 | 6/2019 | Hoffmann |

FOREIGN PATENT DOCUMENTS

| CA | 3029322 A1 * | 1/2018 | .......... A01B 79/005 |
| WO | 2011067559 A1 | 6/2011 | |
| WO | 2018001893 A1 | 1/2018 | |

OTHER PUBLICATIONS

Lucas, John A., Nichola J. Hawkins, and Bart A. Fraaije. "The evolution of fungicide resistance." Advances in applied microbiology 90 (2015): 29-92. (Year: 2015).*

(Continued)

*Primary Examiner* — Karlheinz R. Skowronek
*Assistant Examiner* — Noah A. Auger
(74) *Attorney, Agent, or Firm* — MORRISON & FOERSTER LLP

(57) ABSTRACT

A method and a system for the detection and acquisition of resistances of harmful organisms to pest control agents. The system is configured to establish a resistance map, in which information regarding the resistance of one or more harmful organisms to one or more control agents is recorded for a field or a plurality of fields for the cultivation of cultivated plants.

14 Claims, 2 Drawing Sheets

(51) Int. Cl.
 G06Q 50/02 (2024.01)
 G09B 29/00 (2006.01)
 G16B 20/00 (2019.01)
 G16B 30/00 (2019.01)
 G16B 40/00 (2019.01)
(52) U.S. Cl.
 CPC ............. *G16B 20/00* (2019.02); *G16B 30/00* (2019.02); *G16B 40/00* (2019.02)

(56) References Cited

OTHER PUBLICATIONS

Panozzo, S., Colauzzi, M., Scarabel, L., Collavo, A., Rosan, V., & Sattin, M. (2015). iMAR: an interactive web-based application for mapping herbicide resistant weeds. Plos one, 10(8), e0135328. (Year: 2015).*

Knox, T. B., Juma, E. O., Ochomo, E. O., Pates Jamet, H., Ndungo, L., Chege, P., . . . & Coetzee, M. (2014). An online tool for mapping insecticide resistance in major Anopheles vectors of human malaria parasites and review of resistance status for the Afrotropical region. Parasites & vectors, 7, 1-14. (Year: 2014).*

Tranel, P. J., & Wright, T. R. (2002). Resistance of weeds to ALS-inhibiting herbicides: what have we learned?. Weed science, 50(6), 700-712. (Year: 2002).*

Menchari, Y., Camilleri, C., Michel, S., Brunel, D., Dessaint, F., Le Corre, V., & Délye, C. (2006). Weed response to herbicides: regional-scale distribution of herbicide resistance alleles in the grass weed Alopecurus myosuroides. New Phytologist, 171(4), 861-874. (Year: 2006).*

McArthur, A. G., Waglechner, N., Nizam, F., Yan, A., Azad, M. A., Baylay, A. J., . . . & Wright, G. D. (2013). The comprehensive antibiotic resistance database. Antimicrobial agents and chemotherapy, 57(7), 3348-3357. (Year: 2013).*

Liu, B., & Pop, M. (2009). ARDB—antibiotic resistance genes database. Nucleic acids research, 37(suppl_1), D443-D447. (Year: 2009).*

Thompson, J. F., & Steinmann, K. E. (2010). Single molecule sequencing with a HeliScope genetic analysis system. Current protocols in molecular biology, 92(1), 7-10. (Year: 2010).*

Illumina (2009). Specification Sheet: Illumina® Sequencing. In illumina (pp. 1-4). https://www.illumina.com/content/dam/illuminamarketing/documents/products/specifications/specification_genome_analyzer.pdf (Year: 2009).*

Dickinson, M. (2015). Loop-mediated isothermal amplification (LAMP) for detection of phytoplasmas in the field. Plant Pathology: Techniques and Protocols, 99-111. (Year: 2015).*

Choi, G., Song, D., Miao, J., Cui, L., & Guan, W. (2016, November). Mobile all-in-one malaria molecular diagnosis for field deployment in resource-limited areas. In 2016 IEEE Healthcare Innovation Point-Of-Care Technologies Conference (HI-POCT) (pp. 212-215). IEEE. (Year: 2016).*

Gene III Flyer. (2014). Genie® III Isothermal DNA/RNA Amplification Platform. Www.optigene.co.uk; OptiGene Limited. chrome-extension://efaidnbmnnnibpcajpcglclefindmkaj/https://www.optigene.co.uk/wp-content/uploads/2024/05/Optigene-Genie-III-A4-Flyer-ARTWORK-1.pdf (Year: 2014).*

Morales-Rodriguez, A., Ospina, A., & Wanner, K. W. (2017). Evaluation of four bait traps for sampling wireworm (Coleoptera: Elateridae) infesting cereal crops in Montana. International journal of insect science, 9, 1179543317709275. (Year: 2017).*

International Search Report and Written Opinion of International Search Authority mailed Apr. 10, 2019 for PCT Application No. PCT/EP2019/051829 filed Jan. 25, 2019, 22 pages.

Loose, M. et al. (2016). "Real-time selective sequencing using nanopore technology," Nature Methods, 13(9):751-754.

Schmidt, S. et al. (Jan. 2017). "Identification of bacterial pathogens and antimicrobial resistance directly from clinical urines by nanopore-based metagenomic sequencing," Journal of Antimicrobial Chemotherapy, 72(1): 104-114.

\* cited by examiner

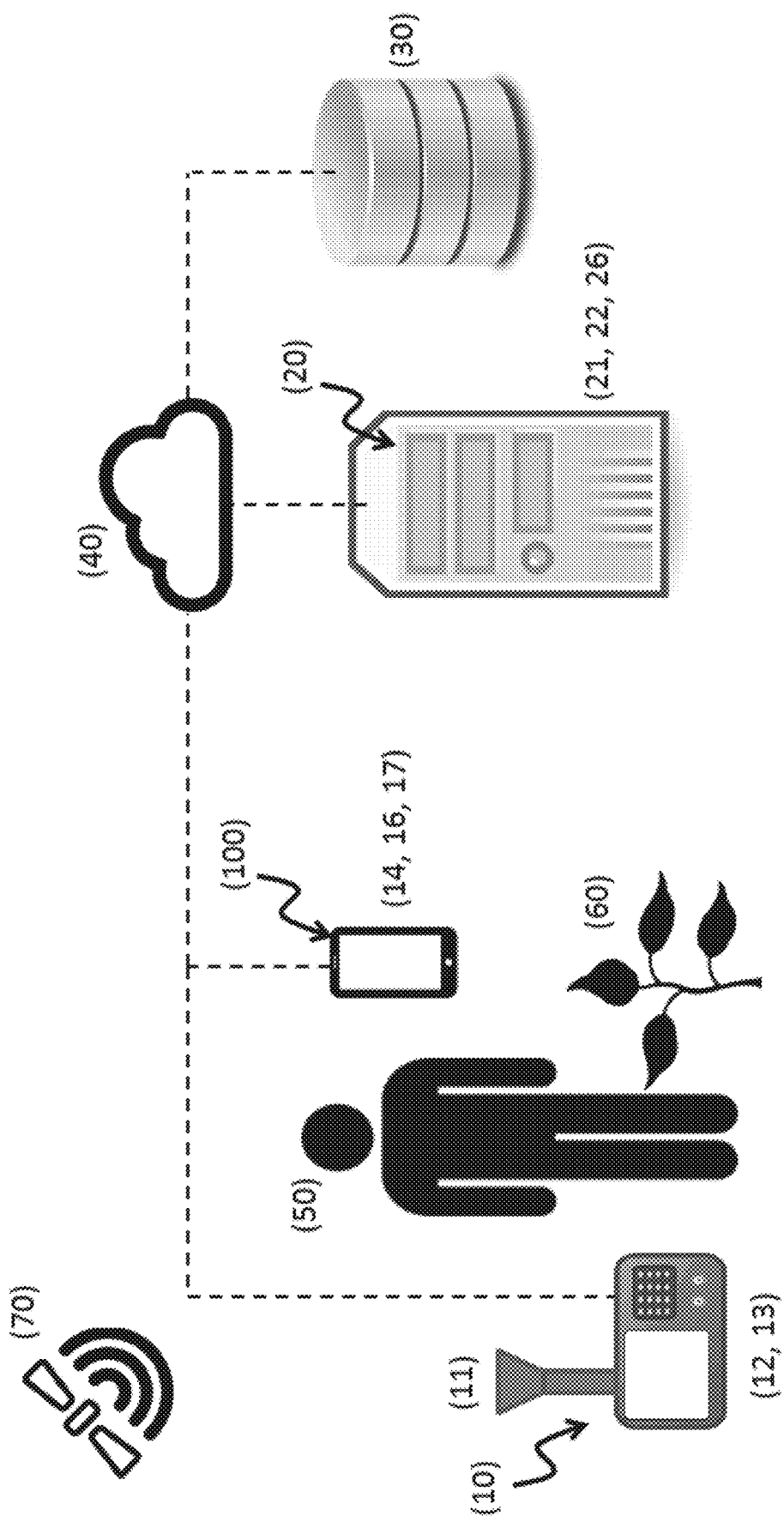

CONTROL OF RESISTENT HARMFUL ORGANISMS

CROSS REFERENCE TO RELATED APPLICATIONS

This application is a national stage application under 35 U.S.C. § 371 of International Application No. PCT/EP2019/051829, filed Jan. 25, 2019, which claims the benefit of European Application No. 18154903.1, filed Feb. 2, 2018.

FIELD OF THE DISCLOSURE

The present invention is concerned with the recognition of resistances in harmful organisms to control agents. Specifically, methods and systems for recognizing and logging resistances. The methods and systems relate to creating a resistance map in which information on the resistance of one or more harmful organisms to one or more control agents is listed for a field or a plurality of fields for the growing of crop plants.

BACKGROUND OF THE DISCLOSURE

The concept of resistance is understood generally as the power of an organism to resist pathogens, harmful environmental effects, and certain active ingredients. A major problem is posed in particular by the (increasing) resistance of organisms to agents for the control of these organisms.

As an example, modern agriculture may be cited. Whereas the worldwide population is growing, the surface area which can be exploited agriculturally is tending more to decrease than to increase. To be able in future to feed the global population, it is necessary for the yield per unit area to be raised further. Crop protection agents such as, for example, herbicides, insecticides, acaricides, nematicides, and fungicides have in the past contributed considerably to the raising of yields. Increasingly, though, resistances are being observed in weeds, fungi, bacteria, insects, and other harmful (invertebrate) organisms.

Another example is that of vector control. There are many diseases transmitted by mosquitos (e.g., malaria, yellow fever, Zika virus infection, etc.) or bugs (e.g., Chagas disease). With vectors as well, resistances are (increasingly) being observed to control agents for preventing the spread of diseases.

SUMMARY OF THE DISCLOSURE

At present there are regulatory and logistical barriers preventing prompt identification of resistances and resistance mechanisms. In order to control resistances and to prevent the spread of resistant harmful organisms, however, it is important to be able to recognize them at an early stage and monitor their spread.

In some embodiments, a method comprises collecting a sample at a location, said sample comprising at least part of a harmful organism, ascertaining geocoordinates of the location, processing the sample, sequencing DNA and/or RNA of the harmful organism and ascertaining one or more DNA and/or RNA sequences, analyzing the one or more DNA and/or RNA sequences for markers which give an indication of resistance of the harmful organism to a control agent, entering information about the resistance of the harmful organism to the control agent into a resistance map, characterized in that at least the steps of collecting, processing, and sequencing are carried out at the same location.

In some embodiments, a system comprises:
means for taking a sample at a location, said sample comprising at least part of a harmful organism,
means for ascertaining geocoordinates of the location,
means for processing the sample,
means for sequencing DNA and/or RNA of the harmful organism and for ascertaining one or more DNA and/or RNA sequences,
means for analyzing the one or more DNA and/or RNA sequences for markers which give an indication of resistance of the harmful organism to a control agent,
means for entering information about the resistance of the harmful organism to the control agent into a resistance map,
characterized in that at least the means for collecting, processing, and sequencing are deployable at the same location.

In some embodiments, the system may be configured for creating a resistance map in which information on the resistance of one or more harmful organisms to one or more control agents is listed for a field or a plurality of fields for the growing of crop plants.

Embodiments are described in more detail below, without distinction between the subjects of the invention (method, system, use). The descriptions_ which follow are intended instead to be valid analogously for all subjects of the invention, irrespective of the context (method, system, use) in which they take place.

Any mention, in the present description or in the claims, of steps in a sequence does not necessarily mean that the invention is confined to the stated sequence. It is instead conceivable for the steps to be performed alternatively in a different sequence or else in parallel with one another, unless one step builds on another step, so necessarily requiring the building step to be performed subsequently (something which, however, is made clear in each individual case). The stated sequences therefore represent preferred embodiments of the invention.

In some embodiments, the present invention provides means allowing a user to recognize whether a harmful organism has appeared in a region and could develop, is in the process of developing, or has already developed resistance to a control agent.

The term "region" refers generally to a spatially delimitable tract of the Earth's surface (including expanses of water). A region may comprise one or more agriculturally exploited or exploitable areas (fields) or a geographic domain. This may be a domain in which aquaculture is practiced. It may be a heathland and/or a domain in which animals are farmed. It may be a nature conservancy domain, a forest and/or a national park. It may be a storage facility for plant products. Further regions are conceivable.

A "harmful organism" is understood as meaning an organism which acts as a causative organism or transmitter of diseases in humans and/or animals or which is capable of appearing when crop plants are grown and of damaging the crop plant, adversely affecting the harvesting of the crop plant, or competing with the crop plant for natural resources. Examples of harmful organisms are vectors, broadleaf weeds, gramineous weeds, animal pests such as beetles, caterpillars, and worms, for example, fungi, and pathogens (e.g., bacteria and viruses). Although viruses, biologically speaking, are not counted as organisms, they are nevertheless intended presently to come under the heading of harmful organisms.

The term "control agent" refers to an agent with which harmful organisms can be effectively controlled and/or their spread prevented. Examples of control agents are herbicides, insecticides, nematicides, acaricides, and fungicides. A control agent typically comprises one or more active ingredients. "Active ingredients" are chemical or biological substances which in an organism have a specific effect and/or evoke a specific response.

In a first step, at least one sample is collected, said sample comprising at least part of a harmful organism. The term "collecting" should not be understood in any way as limiting. One example of a synonymous term is the term "sampling".

The sampling that takes place may be automated. "Automated" means that the sampling is accomplished without human input, by a machine or by a plurality of machines. Analogously, the steps of ascertaining geocoordinates, processing the sample, sequencing, analyzing DNA and/or RNA sequences, and/or entering information about resistance into a resistance map may also be automated.

Sampling may take place with the aid of a mobile device or by means of a mobile device which, for example, moves or is moved in a field for crop plants and/or moves or is moved over the field. Conceivable, for example, is the use of a (preferably unmanned) land machine and/or of a (preferably unmanned) aircraft (e.g., a drone) and/or of a robot. Sampling may alternatively be accomplished by one or more devices which are constructed in stationary form at a location. It is conceivable, furthermore, for a user to carry with them a mobile device, to carry out sampling themselves, and to supply the sample to the device.

The nature of the sample is dependent on the harmful organism for which the aim is to examine whether individuals are present which are developing or have developed resistance to a control agent. The sample is typically a harmful organism or part of a harmful organism.

Where, for example, the harmful organism is a broadleaf or gramineous weed which is to be analyzed in respect of resistance to a herbicide, a sample is taken from the broadleaf or gramineous weed—for example, a leaf, a flower, or the like.

The term "weed" (plural: weeds) refers to plants of the spontaneous accompanying vegetation (segetal flora) in stands of crop plants, on grassland or in gardens, these plants being not deliberately grown in those settings and developing, for example, from the soil seed potential or being airborne. The term is not confined to broadleaf plants in the strict sense, but instead also encompasses grasses, ferns, mosses, or woody plants. In the area of crop protection, another term frequently utilized is "gramineous weed" (plural: gramineous weeds), in order to clarify a delimitation from the herbaceous plants. In the present text, the term "weed" is used as a generic term, intended also to encompass the term gramineous weed, unless reference is made to specific broadleaf or gramineous weeds.

Sampling in the case of a broadleaf/gramineous weed may be assisted by image recognition techniques. It is conceivable, for example, for a camera to generate digital images of the plants in the field, and for the images to be transmitted to an image analysis unit. The image analysis unit is configured to identify features in the images that point to the presence of a broadleaf/gramineous weed. The images may be analyzed using, for example, techniques of pattern recognition or else self-learning systems (e.g., artificial neural networks). It is conceivable for the image analysis unit to be configured to recognize one or more defined gramineous/broadleaf weed species. Also conceivable is for the image analysis unit to be configured to recognize that a plant in the image is not the crop plant being grown (and hence is a plant which may compete with the crop plant for resources and/or affect the quality of the harvest). Methods and systems for recognition of broadleaf/gramineous weeds are described in the prior art (see, for example, WO2017194398, WO2017194399). Also conceivable, however, is for a sample to be taken from a plant which can be assumed to be a broadleaf/gramineous weed, because, for example, it is growing in a place where no crop plant has been planted/sown or it has already developed to a further stage than the crop plants planted/sown in the field.

Where the harmful organism is a fungus or a virus or a bacterium, a sample is preferably taken from the infested organism (in/on which the fungus or the virus or the bacterium is located). The infested organism may be identified, for example, by image recognition techniques; for example, the company Peat GmbH offers, on a commercial basis, a software application ("app") for identifying plant diseases on the basis of image recognition techniques (e.g., the Plantix app).

Where the harmful organism is an animal pest—such as, for example, an insect (in the various stages of larva (caterpillar, pseudocaterpillar) through to the adult stage), a slug or snail, a worm (nematodes), or an arachnid—it is possible to use a trap to catch the animal pest, to then supply said pest (or parts of it) for analysis. For the capture of animal pests there are a multiplicity of options, such as, for example, glue-coated panels, pan traps (pans filled with water and a surfactant, for example), and the like. A trap may be provided with a bait to attract the animal pest.

It is also conceivable to take air, water and/or soil samples in which harmful organisms are located. Sampling of animal excretions is also conceivable.

It may be the case that the reason for the sampling is that a harmful organism has been observed—for example, by inspection or automatically by means of image recognition techniques.

It may also be the case that the sampling has taken place as a result of the suspected incidence of the harmful organism. It is conceivable, for example, that, using a forecast model, a risk of infestation with the harmful organism has been ascertained, the risk lying above a defined threshold value. It is conceivable that infestation has been observed in the vicinity of the location at which a sample is collected.

It may also be the case that the reason for the sampling is a suspicion of existing or oncoming resistance. It is conceivable, for example, for an observation to have been made, when controlling a harmful organism with a control agent, that the control agent is not developing the desired effect.

It may alternatively be the case that the (only) reason for the sampling is the charting of resistances.

One or more samples are taken at a single location or at a plurality of locations.

For those locations at which one or more samples are/have been taken, the geocoordinates associated with the location are ascertained. This is important to enable information concerning a resistance to be associated with the corresponding location and entered in a resistance map.

The geocoordinates are typically ascertained using a positional determination system. One known positional determination system is a satellite navigation system such as NAVSTAR GPS, GLONASS, Galileo, or Beidou, for example. Given that the abbreviation GPS (Global Positioning System) is established in everyday language as a generic designation for all satellite navigation systems, the term GPS is used hereinafter as a collective designation for all positional determination systems.

It is conceivable for the sampling device to possess a GPS sensor. A mobile device may move, for example, through a field for crop plants, take one or more samples at a plurality of locations, use the GPS sensor to ascertain the geocoordinates of the locations at which samples have been taken, and store this information in a data memory of the device and/or transmit this information via a (mobile) network to an external computer system. It is also conceivable for the mobile device to travel, using the GPS sensor, to one or more locations defined beforehand. For example, a forecast model might have ascertained one or more locations at which there is an increased risk of the incidence of (resistant) harmful organisms. These locations could be found by the mobile device, in order to take one or more samples at these locations. When a sample has been taken and when the sample has been analyzed, the result of the analysis may be stored together with the geocoordinates in a data memory of the device and/or transmitted via a (mobile) network to an external computer system.

It is also conceivable for a mobile device to be moved by a user. At the location at which the user is taking a sample, the geocoordinates of the sampling location are ascertained/logged. It is conceivable for the user to be guided, with the aid of a GPS sensor, by the mobile device to locations defined beforehand. In that case the user may be assisted by technologies of augmented reality. With these technologies, a real world is displayed on a screen and this display is extended optically by computer-generated pieces of extra information. It is conceivable, for example, to display the real world on the screen of a computer system (e.g., smartphone) in what is called live mode and to augment this display with virtual objects which represent the traps that have been set and are to be found. Also conceivable is the use of a head-up display or of a head-mounted display (e.g., video glasses (Eye Tap)). Also conceivable is that the user is guided to traps for harmful organisms that have been set beforehand, the guidance being carried out using GPS sensor and, optionally, technologies of augmented reality.

Where the device for sampling is a stationary unit, that may likewise be equipped with a GPS sensor in order to be able to log/ascertain its position. Preferably, however, its position is already determined or confirmed at the time the device is set up. It may be the case, for example, that a device is set up at a location and then with a (separate) GPS sensor the geocoordinates of the location of the set-up device are determined. Also conceivable is that the geocoordinates of a location at which a device is to be set up are determined, and then the device is set up at the position determined accordingly. The situation of the device may for example be/have been noted in a database and/or on a digital map. It may be the case that a device possesses an unambiguous identifier (for example, an ID number). Where such a device transmits information about a sample to an external computer system, it authenticates itself by means of the unambiguous identifier, for example. A database may contain a record of the position at which a particular device with a particular identifier has been set up. Consequently, by interrogating the database using the unambiguous identifier, it is likewise possible to ascertain the position of a device.

An advantage of site determination by means of a global satellite navigation system is the great accuracy. An alternative method, better but less precise, utilizes a radio standard for site determination. It is conceivable, for example, for the system to possess a transmitting unit with which it is able to transmit results of the analysis to a computer system. Such a transmission may take place, for example, over a mobile radio network. In mobile radio, the simplest type of site determination is based on the fact that the cell within which a transmitting unit is located is known. Since, for example, a switched-on mobile phone is in communication with a base station, the position of the mobile phone can be assigned at least to one mobile cell (cell ID). With the aid of GSM (Global System for Mobile Communications), the site of a transmitting unit can be determined to an accuracy of several hundred meters. In cities, the site can be determined to an accuracy of 100 to 500 m; in rural areas, the radius increases to 10 km or more. If the information via the cell ID is combined with the TA parameter (TA: Timing Advance), then the accuracy can be enhanced. The greater this value, the further away the transmitting unit is from the base station. Using the EOTD method (EOTD: Enhanced Observed Time Difference), a transmitting unit can be located with even greater accuracy. In that case the differences in transit time of the signals between the transmitting unit and a number of receiving units are determined.

In one embodiment, the transmission of information and the site determination take place by way of the Sigfox network. Sigfox is a low-power, wide-area network (LP-WAN) and is designed specifically for small data packets and a very power-economical operation. Sigfox base stations are able to communicate over long distances, without being affected by disruptions. The range of an individual base station, which may administer up to one million transmitting units, is 3 to 5 km in densely populated centers and 30 to 70 km in rural domains. With Sigfox, the data packets from all base stations in the transmitting zone are received. In this way it is possible to determine the position of a transmitting unit.

The geocoordinates are ascertained preferably with an accuracy of at least 100 meters.

After a sample has been taken, it is processed. The purpose of the processing is to prepare for subsequent sequencing of DNA and/or RNA. By means of the processing, the sample or part of the sample is therefore processed and/or prepared in such a way that it can be passed on for sequencing. The corresponding processing measures are described in the prior art (see, for example, R. P. Schaudies (Ed.): *Biological Identification*, Woodhead Publishing Series in Electronic and Optical Materials: Number 59, Elsevier 2014, ISBN 978-0-85709-501-5; Jianping Xu: *Next-generation Sequencing*, Caister Academic Press 2014, ISBN 978-1-908230-33-1; Vijai Bhadauria: *Next-generation Sequencing and Bioinformatics for Plant Science*, Caister Academic Press 2017, ISBN 978-1-910190-65-4).

Processing takes place at the same location at which the sample was taken. This means that the sample, immediately after having been collected, is passed on for further processing and sequencing. It is therefore not sent to a laboratory to be studied there, but is instead studied on site. This may also mean that a sample is taken by a moving device and the sample is subsequently processed on the still-moving device and passed on for sequencing.

The processing is followed immediately by the sequencing of RNA and/or DNA. The purpose of the sequencing is to identify resistance markers.

A "resistance marker" is a piece of genetic information which reveals whether a harmful organism might develop, is developing, or has developed resistance to a control agent. The sequencing and analysis of the sequences serves to identify one or more resistance markers in the sample.

The term "resistance" refers to a heritable property of individual harmful organisms of one species that is manifested by these individuals withstanding a treatment with a control agent with which the species can normally be controlled, and concluding their lifecycle normally.

It is possible to distinguish between two types of resistance: locus-specific resistance, also called target site resistance, and metabolic resistance, also called non-target site resistance. Both types of resistance can be charted in accordance with some embodiments of the invention.

The analysis looks at whether there are defined DNA and/or RNA sequences present quantitatively and/or qualitatively in the sample which indicate that the harmful organism might develop, is developing, or has developed resistance to a control agent. In the identification of resistance markers, it is possible to look at whether there are DNA sequences and/or RNA sequences in the sample that are known to be responsible for resistance. In the case of metabolic resistances, moreover, it is possible to use the quantity of the corresponding RNA in the organism as a resistance marker. It is also conceivable that a DNA and/or RNA sequence is identified which coincides neither with the sequences of known resistance markers nor with sequences of the nonresistant harmful organism. This new type of sequence might point to a newly forming resistance and/or might indicate a new resistance marker.

Which DNA sequences and/or RNA sequences indicate that the harmful organisms have or are developing resistance to a control agent are known for a multiplicity of harmful organisms. A DNA sequence and/or RNA sequence of this kind and/or the quantity thereof is a resistance marker in the sense of the present invention. A number of examples are set out below—including for the purpose of illustrating the procedure for finding new resistance markers.

Acetolactate synthase (ALS or AHAS for short) is an enzyme which in many prokaryotes and eukaryotes is involved in the formation of the branched-chain amino acids valine, leucine, and isoleucine. This enzyme is the locus of action (target) for a range of herbicide classes, known under the designation of ALS-inhibiting herbicides: sulfonylureas, imidazolinones, triazolopyrimidines, pyrimidiny 1-thiobenzoates, and sulfonyl-aminocarbinyltriazolinones. There are now a multiplicity of broadleaf/gramineous weeds known which display resistance to the ALS-inhibiting herbicides (e.g., weeds listed in the International Herbicide-Resistant Weed Database). J. Rey-Caballero et al. studied the causes of the resistance of *Papaver rhoeas* (corn poppy) to the ALS-inhibiting herbicides (Pesticide Biochemistry and Physiology 138 (2017) 57-65). It was found that in three multiply resistant populations, six amino acids were exchanged. The gene sequences correspondent with the amino acids are resistance markers in the sense of the present invention.

J. A. C. Gardin et al. showed which genetic factors are responsible in the case of *Alopecurus myosuroides* for resistance to ALS-inhibiting herbicides (BMC Genomics (2015) 16:590). These can be used as resistance markers in the sense of the present invention.

There are numerous studies relating to the gene families in plants (broadleaf/gramineous weeds) which encode cytochrome P450, glutathione S-transferases, glycosyltransferases, and ABC transporters, and their involvement in the development of non-target site resistances to herbicides (see, for example, J. S. Yuan et al.: *Non-target-site herbicide resistance: a family business*, TRENDS in Plant Science Vol. 12 No. 1 (2006) pages 6 to 13, and the publications cited therein). The resistance-causing genes and gene families disclosed therein are resistance markers in the sense the present invention.

R. H. Ffrench-Constant gives an overview of the genes and gene families involved in the development of resistances in insects to insecticides (Genetics, Vol. 194 (2013) 807-815). The resistance-causing genes and gene families disclosed therein are resistance markers in the sense of the present invention.

So-called diamide insecticides (e.g., insecticides listed in the British Crop Production Council's Pesticide Manual) are especially effective control agents on butterflies and moths (Lepidoptera), an example being the tomato leafminer moth. In the case of the species *Tuta absoluta*, resistances have increasingly been observed with respect to diamide insecticides. E. Roditakis et al. were able to pinpoint specific mutations as the genetic causes of the development of resistance (Insect Biochemistry and Molecular Biology 80 (2017) 11-20). The DNA sequences affected by the mutations are resistance markers in the sense of the present invention.

Y. Pan et al. show which genetic factors are responsible in the case of the aphid *Aphis gossypii* for resistance to the insecticide spirotetramat (Insect Molecular Biology (2017) 26(4), 383-391 doi: 10.1111). These factors may be used as resistance markers in the sense of the present invention.

Z. Ma et al. were able to show that a resistance to DMI fungicides in the case of the fungus *Blumeriella jaapii* is mediated by overexpression of the CYP51 gene (Applied and Environmental Microbiology, Apr. 2006, p. 2581-2585). An overexpression of the CYP51 gene is a resistance marker in the sense of the present invention.

S. Omrane et al. showed which genetic factors in the case of the fungus *Zymoseptoria tritici* are responsible for a resistance to a multiplicity of fungicides (doi: 10.1128/mSphere.00393-17). These factors can be used as resistance markers in the sense of the present invention.

For the identification of resistance markers in the field on the basis of DNA and/or RNA sequencing, methods have been published (WO2011067559A1, WO2012042226, WO2013041878, WO2013098561, WO2013121224, WO2014064443, WO2015140535, WO2015150786, WO2015173587, WO2016059436, WO2016059427, WO2017203269). The company Oxford Nanopore Technologies Ltd. makes available, on a commercial basis, corresponding sequencing tools (see, for example, M. Loose et al: Real-time selective sequencing using nanopore technology, Nature Methods Vol. 13 No. 9 (2016) 751-758).

By means of the sequencing and analysis of the sequences it is possible, therefore, to tell whether an individual of a harmful organism has developed resistance to a control agent or whether genetic alterations are present which indicate that the harmful organism is developing or might develop resistance.

The result of the analysis is set down in a resistance map. A "resistance map" is a representation of part of the Earth's surface in which, for a plurality of locations on the Earth's surface, information is set down as to whether, at the corresponding location, a harmful organism has been observed, wherein there is resistance to a control agent or wherein a known or unknown potential resistance is developing. The resistance map is preferably a digital reference map. The term "digital" means that the map can be processed by a machine, generally a computer system. "Processing" refers to the known methods of electronic data processing (EDP). A "digital resistance map" is therefore a digital representation of part of the Earth's surface in which, for a plurality of locations on the Earth's surface, information is set down as to whether, at the corresponding location, a harmful organism has been observed, wherein there is resistance to a control agent or wherein a known or unknown potential resistance is developing. The digital resistance map is preferably a digital representation of a field, or of a field including adjacent fields, or of a region. Separate resistance maps, preferably, are generated for individual harmful organisms and for individual control agents or groups of control agents which exhibit the same active ingredient or the same chemical/biological class (e.g., a chemical structural class) or the same mechanism of action or the same locus of action (target). It is possible, preferably, to link separate digital resistance maps to one another, i.e., to superimpose them on one another virtually. Additionally reported in the digital resistance maps, preferably, are the particular crop plants growing in which areas.

In one preferred embodiment, the timing or timings at which the respective analysis was carried out are recorded for each location on the digital resistance map for which there are one or more analytical results.

In one preferred embodiment, a plurality of digital resistance maps are linked with one another in such a way as to show the development of one or more resistances over time.

It is possible, preferably, for digital resistance maps to be combined with other digital maps; for example, with digital maps relating to soil type, water level, crop plants grown, temperatures (at defined times and/or for defined timespans in the form, for example, of mean and/or minimum and/or maximum temperatures), precipitation levels (at defined times and/or for defined timespans in the form, for example, of mean and/or minimum and/or maximum precipitation levels), insolation, air mass movements (wind directions and wind forces), past infestations with one or more harmful organisms, agricultural measures taken (e.g., sowing, watering, plowing, application of crop protection agents, administration of nutrients, and the like), etc. The values of the parameters that are set down in a digital map may be measured values and/or predicted values.

In some embodiments at least the steps of collecting a sample comprising at least part of a harmful organism at a location, processing the sample, and sequencing DNA and/or RNA of the harmful organism and ascertaining one or more DNA and/or RNA sequences may be carried out at the same location, and/or the means for taking a sample comprising at least part of a harmful organism at a location, and the means for processing the sample, and the means for sequencing DNA and/or RNA of the harmful organism and for ascertaining one or more DNA and/or RNA sequences of the system may be configured in such a way that they are deployed at the same location.

This means that samples are studied directly at the location at which they have been collected/taken. The stated steps are the steps associated with the handling of material. Because these steps are carried out in situ, there is no need to use time, for example, for transporting samples from the sampling location to the location of sample processing and/or sequencing. All of the rest of the steps of the method are connected not with the handling of material but rather merely with the processing of data. Data can be sent throughout the globe at high speed. The sending of data, accordingly, is not a rate-determining step in the method. The data is preferably processed at the location where corresponding computing capacities are available inexpensively. It is also conceivable for the processing of data to take place in situ; this, however, is not necessary in order to achieve the high speed offered by embodiments of the present invention in the creation of digital resistance maps.

The expressions "at the same location" or "in situ" mean that no sample is transported over a distance which is greater than the accuracy of the positional determination system. Within the method, a sample is preferably transported over a distance that is less than 100 meters, preferably less than 50 meters, more preferably less than 50 meters. As already illustrated above, the location may also be a traveling device.

By virtue of the fact that the analyses are carried out in situ, the results are available very quickly, and information concerning any resistance and its spread can be obtained almost in real time. As a result it is possible to respond very rapidly to developing and/or spreading resistances.

A reference map may provide a farmer, for example, with valuable information as to the presence or genesis of resistances in particular areas of his field (or fields). Patterns of spread can be analyzed in order to find out the causes of the genesis and/or spread of resistances. With a number of temporally sequential analyses, the farmer gains insight into the spread of resistances. He can then take measures to combat the resistances. In a reference map, a farmer is also able to recognize whether infestation by resistant harmful organisms has been observed in adjacent fields. The information may help him to take preventive measures for his fields.

Furthermore, relatively detailed digital resistance maps generated almost in real time, in combination with additional data, such as insolation, temperature, air humidity, and wind direction, for example, permit a more precise prediction of the spread of resistant and nonresistant harmful organisms. This allows targeted control, and/or prophylactic treatment of bordering territories, and also a more targeted deployment of control agents.

Furthermore, the targeted logging of genetic information on harmful organisms in the environment allows an estimation of an impending development of resistance to a particular control agent.

In some embodiments, a measure is carried out for controlling a harmful organism and/or a (developing) resistance on the basis of the resistance map. It is conceivable, for example, for those areas affected by a resistant harmful organism (resistant areas), and preferably also areas adjoining the resistant areas, to be treated with a control agent for which no resistance has been identified. Also conceivable is the control of resistant harmful organisms using mechanical and/or physical techniques such as, for example: complete removal, burning, destruction by cold, destruction by electrical energy, destruction by electromagnetic energy (e.g., using UV light, laser light), and the like.

Embodiments of the invention are described in more detail below, using specific working examples and figures, without any wish to restrict the invention to these examples or to the features and/or combinations of features that are shown in the examples.

BRIEF DESCRIPTION OF THE FIGURES

FIG. 2 shows, schematically, another embodiment of the system of the present disclosure.

DETAILED DESCRIPTION OF EXEMPLARY EMBODIMENTS

Figure 1:
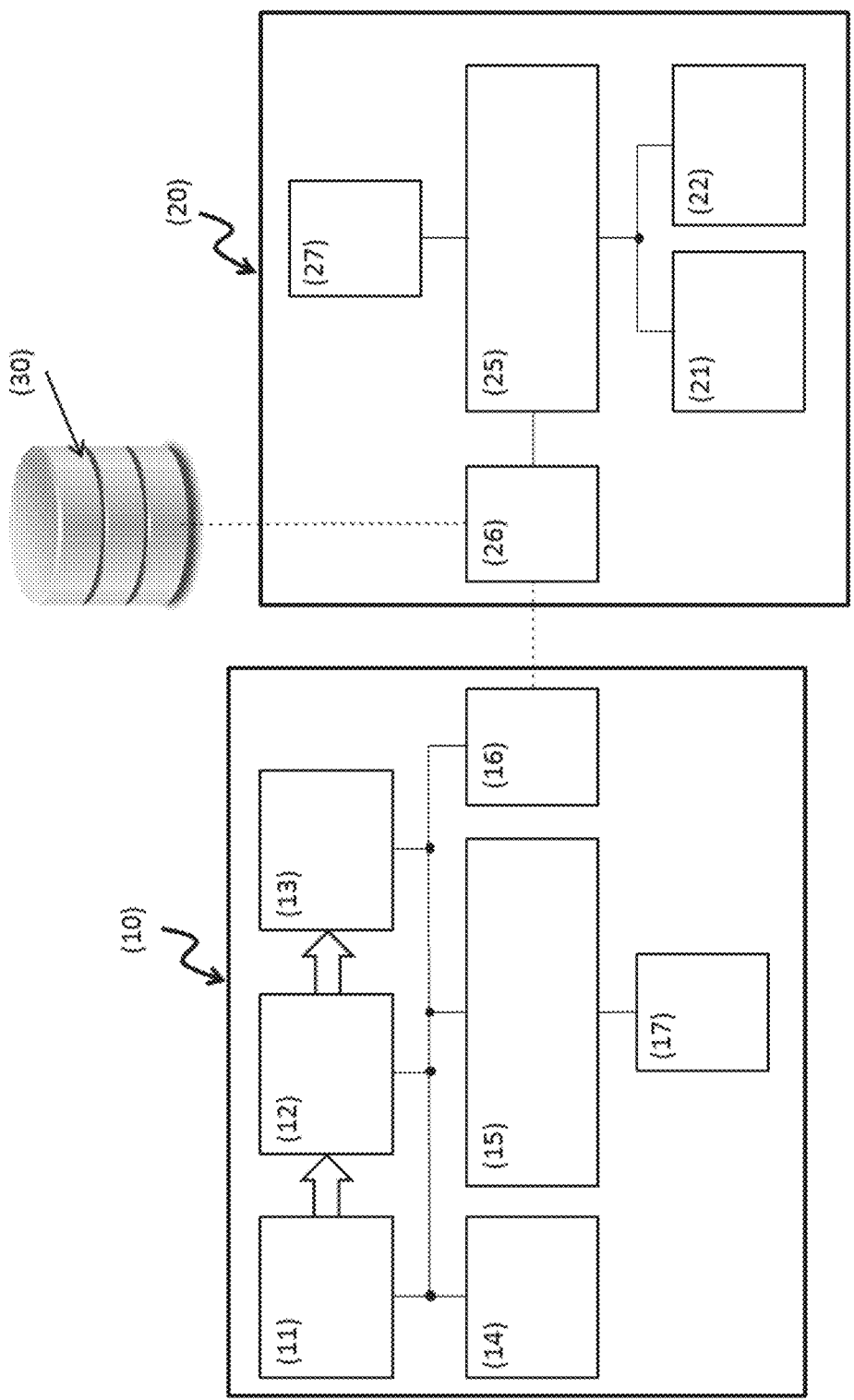
FIG. 1 shows schematically an embodiment of the system of the present disclosure.

FIG. 1 shows schematically an embodiment of the system. The system comprises three devices (10, 20, 30); in some embodiments, it is conceivable for a system to comprise more or fewer devices. The three devices (10, 20, 30) can exchange data with one another via a network (represented by the dashed lines).

A first device is a sample analysis device (10), a second device is a data analysis device (20), and a third device is a database (30).

The sample analysis device (10) is deployed where harmful organisms occur and are studied in respect of resistances to control agents. The sample analysis device (10) comprises a positional determination unit (14) for ascertaining the geocoordinates of the location at which the sample analysis unit (10) is located at the time of a sampling. The sample analysis device (10) further comprises a sampling unit (11) for taking a sample of a harmful organism or of part of a harmful organism. The design of the sampling unit (11) may be such that it actively takes samples; it may alternatively have a design such that one or more samples are supplied to it manually or mechanically.

From the sampling unit (11), a sample taken is passed to a sample processing unit (12). In the sample processing unit (12), the sample is prepared for subsequent sequencing of extant DNA and/or RNA.

When the sample has been prepared, it is passed to a sequencing unit (13). This is where the sequencing of DNA and/or RNA takes place. The result of the sequencing comprises one or more DNA and/or RNA sequences.

The sample analysis device (10) has a control unit (15). The control unit (15) serves to control the individual components of the sample analysis device (10) and to coordinate the data and signal flows. The DNA and/or RNA sequences ascertained in the sequencing, and the geocoordinates of the location at which the sample was taken, are passed on by the control unit (15) to a transmitting and receiving unit (16). From there, they are transmitted via a network (e.g., mobile radio network and/or Internet) to the data analysis device (20).

The data analysis device (20) comprises a transmitting and receiving unit (26), which receives the geocoordinates and the DNA and/or RNA sequences.

The data analysis device (20) further comprises a control unit (25) for controlling the individual components of the data analysis device (20) and coordinating the data and signal flows. The transmitting and receiving unit (26) passes on the data received to the control unit (25). The control unit passes on the data to a sequence analysis unit (21).

The sequence analysis unit (21) analyzes the DNA and/or RNA sequences. The intention with the analysis is to ascertain DNA and/or RNA sequences which are known to indicate a resistance of the harmful organism to one or more control agents. Also conceivable, however, is that the sequence analysis unit (21) identifies unknown DNA and/or RNA sequences which give an indication of a new resistance and/or a new resistance marker.

In order to identify known and/or new resistance markers, the data analysis device (20) is connected via the transmitting and receiving unit (26) to a database (30) which stores DNA and/or RNA sequences of known resistance markers and/or DNA and/or RNA sequences of known nonresistant harmful organisms. It is conceivable for there to be a plurality of databases which the data analysis device (20) can access.

The data analysis device (20) further comprises a resistance map creation unit (22). It is configured in such a way that it links the result of the sequence analysis for resistance markers with the geocoordinates and files the result for the sampling location in a digital representation of a region. In this case the information that a sample in which a resistance marker has been identified has been taken at a location can be stored for the respective location. It is also possible for the negative information—that a sample in which no resistance marker has been identified has been taken at a location—to be stored for the respective location. The respective information concerning an observed or non-observed resistance may be coded, for example, using a color (e.g., red for a defined resistance, green for no resistance).

The data analysis device (20) further comprises a user interface (27). The user interface (27) serves for communication between the data analysis device (20) and a user. Via the user interface (27), a user is able to control the data analysis device (20), enter data, read and/or display information, and so on. A user interface (27) of this kind typically has input means (keyboard, mouse, touchscreen, microphone and/or the like) and output means (display, speaker, printer and/or the like).

A resistance map created and/or supplemented by the resistance map creation unit (22) may be transmitted to the database (30) for storage via the transmitting and receiving unit (26). It is conceivable that a multiplicity of users are able to access the database (30) and thus procure information concerning new and/or spreading resistances. It is also conceivable that a resistance map created and/or supplemented by the resistance map creation unit (22) is transmitted to the sample analysis device (10) via the transmitting and receiving unit (26). The sample analysis device (10) receives a resistance map via the transmitting and receiving unit (16). The sample analysis device (10) likewise possesses a user interface (17) for communication with a user. The resistance map may be displayed to a user via the user interface (17). It is also conceivable for the user, in the case of a resistance, to obtain further information—transmitted and displayed—as to which measures they can take in order to prevent the further spread of the resistance.

FIG. 2 shows, schematically, another embodiment of the system. Identical reference symbols in FIGS. 1 and 2 have the same meaning. The system shown in FIG. 2 comprises four devices (10, 20, 30, 100). The four devices (10, 20, 30, 100) are able to exchange data with one another via a network (represented by the dashed lines).

A first device is a sample analysis device (10), a second device is a data analysis device (20), a third device is a database (30), and a fourth device is a mobile computer system (100) such as a smartphone or a tablet computer, for example.

In some embodiments, the system may be operated by a user (50); i.e., the system may be designed in such a way that the actions of a single user (50) can lead to the performance of the method, from the sampling through to the display of a created digital resistance map. In some embodiments, the method is initiated by the user collecting a sample which comprises a harmful organism (60) or part of a harmful organism (60). In the present example, the harmful organism (60) is shown as a plant; here it is conceivable for the harmful organism to be a plant (e.g., a weed). It is, however, also conceivable for the plant to be infested with bacteria, viruses, fungi, or harmful animal organisms, and for a sample of the infested plant that comprises the harmful organism to be taken.

The user (50) passes the harmful organism (60) to a sampling unit (11) of the sample analysis device (10). The sample analysis device (10) possesses means (12) for processing the sample, and means (13) for sequencing DNA and/or RNA of the harmful organism and for ascertaining one or more DNA and/or RNA sequences.

The DNA and/or RNA sequences ascertained are transmitted via a short-range radio connection (e.g., Bluetooth) to the mobile computer system (100). The mobile computer system (100) possesses a GPS sensor (14) that is able to receive signals from multiple satellites (70) and, from these signals, to ascertain the geocoordinates of the location at which the mobile computer system (100) is situated. The mobile computer system (100) transmits the DNA and/or RNA sequences together with the geocoordinates to the data analysis device (20) by means of a transmitting and receiving unit (16) and by way of a cloud server (40). The data analysis device (20) possesses means (21) for analyzing the DNA and/or RNA sequences for markers which give an indication of resistance of the harmful organism to a control agent, and possesses means (22) for entering information concerning the resistance of the harmful organism to the control agent into a digital resistance map.

The data analysis device (20) is connected by the cloud server (40) to one or more databases (30) which store DNA and/or RNA sequences of known resistance markers and/or DNA and/or RNA sequences of known nonresistant harmful organisms. The stored data can be employed in order to analyze the DNA and/or RNA sequences.

The data analysis device (20) further comprises a resistance map creation unit (22), which is configured in such a way that it links the result of the sequence analysis for resistance markers with the geocoordinates and files the result for the sampling location in a digital representation of a region.

A resistance map created and/or supplemented by the resistance map creation unit (22) may be transmitted to a database (30) for storage via the transmitting and receiving unit (26). It is conceivable that a multiplicity of users are able to access the database (30) via the cloud server (40) and thus procure information concerning new and/or spreading resistances. It is also conceivable that a resistance map created and/or supplemented by the resistance map creation unit (22) is transmitted to the mobile computer system (100) via the transmitting and receiving unit (26). The mobile computer system (100) receives the resistance map via the transmitting and receiving unit (16). The mobile computer system (100) possesses a user interface (17) for communication with the user (50). The resistance map may be displayed to the user (50) via the user interface (17). It is also conceivable for the user (50), in the case of a resistance, to obtain further information—transmitted and displayed—as to which measures they can take in order to prevent the further spread of the resistance.

Example 1: A farmer reports pathogen infestation despite treatment with corresponding crop protection agents. Samples of the pathogen are taken in situ by the farmer or salesperson, with or without associated plant material. In situ or at a location in the vicinity of the field, the samples are processed and the DNA and/or RNA in the sample are/is sequenced. The sequence information is transmitted to a server/cloud, analyzed in the cloud, and examined for reference markers for metabolic and target site resistances. At the same time, coordinates and existing resistances are recorded in a geodatabase for studies on resistance spread. Based on the possible resistance mechanism or mechanisms found at this location and on the surroundings, recommendations for a crop protection product are communicated to the farmer.

Example 2: At regular physical and temporal intervals, samples of pathogens are taken in a region and as in example 1, albeit without suspected resistance, are treated in situ and analyzed in the cloud. The data are fed into a geodatabase and analyzed in order to detect latent resistances, in order to predict the spread of resistance mechanisms.

The invention claimed is:

1. A method comprising:
using a sample analysis device comprising a trap, a sensor for ascertaining geocoordinates, a sequencing unit, and a transmitting and receiving unit;
collecting a sample at a location in a field or a plurality of fields for growing of crop plants using the trap, said sample comprising at least part of a harmful organism;
ascertaining geocoordinates of the location at which the sample was collected using the sensor,
sequencing DNA and/or RNA of the harmful organism from the sample and ascertaining one or more DNA and/or RNA sequences using the sequencing unit, and
transmitting data indicating the one or more DNA and/or RNA sequences to a computer system via a network using the transmitting and receiving unit;
using a processor of the computer system:
receiving the data indicating the one or more DNA and/or RNA sequences,
analyzing the one or more DNA and/or RNA sequences for markers which give an indication of resistance of the harmful organism to a control agent, and
entering information about the resistance of the harmful organism to the control agent into a digital resistance map;
wherein at least the collecting and sequencing are carried out at the same location, and
wherein the digital resistance map comprises information on the resistance of the harmful organism to treatment by one or more than one insecticide, acaricide, and/or nematicide applied to the field or the plurality of fields.

2. The method of claim 1, further comprising implementing a measure for controlling a harmful organism and/or a resistance on the basis of the resistance map.

3. The method of claim 1, wherein a plurality of samples are collected at different locations and analyzed, and results of the analysis are entered in the resistance map.

4. The method of claim 3, wherein timing of each sampling is recorded in the resistance map.

5. The method of claim 1, wherein environmental data are entered in the resistance map, said data being selected from the following list: insolation, temperature, air humidity, wind direction, wind force.

6. The method of claim 1, further comprising:
determining whether the one or more DNA and/or RNA sequences include one or more unknown sequences which do not coincide with sequences of known markers or with sequences of a nonresistant harmful organism; and
entering information on the determination of whether the one or more DNA and/or RNA sequences include one or more unknown sequences into the digital resistance map.

7. A system comprising:
a sampling unit device comprising:
a trap configured to collect a sample at a location, said sample comprising at least a harmful organism or part of a harmful organism,
a sensor configured to ascertain geocoordinates of the location at which the sample was collected,
a sequencing unit configured to sequence DNA and/or RNA of the harmful organism and for ascertaining one or more DNA and/or RNA sequences, and a transmitting and receiving unit configured to transmit data indicating the one or more DNA and/or RNA sequences via a network; and a computer system comprising a processor configured to:
receive the data indicating the one or more DNA and/or RNA sequences,
analyze the one or more DNA and/or RNA sequences for markers which give an indication of resistance of the harmful organism to a control agent, and
enter information about the resistance of the harmful organism to the control agent into a a digital resistance map, wherein at least the collecting and sequencing are deployable at the same location, and wherein the digital resistance map comprises information on the resistance of the harmful organism to treatment by one or more than one insecticide, acaricide, and/or nematicide applied to a field or a plurality of fields.

8. The system of claim 7, further comprising:
a data analysis device for generating the digital resistance map, and
a database configured to store DNA and/or RNA sequences of known resistance markers and/or DNA and/or RNA sequences of known nonresistant harmful organisms;
wherein the sample analysis device, the data analysis device, and the database are configured such that they exchange data with one another.

9. The system of claim 7, wherein the resistance map further comprises information on the resistance of one or more weeds to one or more herbicides is listed for a field or a plurality of fields for the growing of crop plants.

10. The system of claim 7, wherein the digital resistance map further comprises information on the resistance of one or more fungi to one or more fungicides is listed for a field or a plurality of fields for the growing of crop plants.

11. The system of claim 7, wherein the digital resistance map further comprises information on the resistance of one or more vectors to one or more agents for controlling the vectors is used for a region or a plurality of regions.

12. The system of claim 7, wherein the trap is configured to collect a sample comprising at least a part of an insect, a slug, a snail, a worm, and/or an arachnid.

13. The system of claim 7, wherein the trap comprises a glue-coated panel, a pan trap, and/or a baited trap.

14. The system of claim 7, wherein the processor is further configured to:
determine whether the one or more DNA and/or RNA sequences includes one or more unknown sequences which do not coincide with sequences of known markers or with sequences of a nonresistant harmful organism; and
enter information on the determination of whether the one or more DNA and/or RNA sequences includes one or more unknown sequences into the digital resistance map.

* * * * *